Dec. 15, 1936.  F. H. BENGE  2,064,144
GEAR
Filed July 20, 1935

Inventor
Frank H. Benge
by his Attorneys
Howson & Howson

Patented Dec. 15, 1936

2,064,144

UNITED STATES PATENT OFFICE 2,064,144

GEAR

Frank H. Benge, Norristown, Pa., assignor to Continental-Diamond Fibre Company, Newark, Del., a corporation of Delaware Application July 20, 1935, Serial No. 32,460

12 Claims. (Cl. 74—445)

This invention relates to fibre or fabric gears known as composite gears, and particularly to resin-impregnated fibre or fabric gears. The invention is applicable generally to gears of this type, including both web and spoke type gears. By the present invention, there is provided novel means for silencing the operation of such gears.

The need for quiet fibre gears is becoming more and more urgent, since these gears are used to a great extent in motor vehicles such as automobiles and, in view of the modern trend toward quiet motor operation, the necessity of providing extremely silent gears becomes quite apparent. The present invention is designed to fulfill this need.

The principal object of this invention is, therefore, to provide an improved fibre or fabric gear which is adapted to operate more quietly than prior gears of this type.

Another object of the invention is to provide a novel fibre gear structure embodying means for silencing the operation of the gear, while maintaining the requisite strength and durability in the gear.

These and other objects of the invention may be attained by the employment of the novel structure exemplified by the accompanying drawing. The invention is illustrated as applied to a fibre spoke gear of the type disclosed in the copending application of John Petho and myself for Fibre spoke gear, Serial No. 655,814, filed February 8, 1933, but this is merely for the purpose of disclosure, it being understood that the invention is not thus limited but is capable of general application, as above stated.

Figure 1:
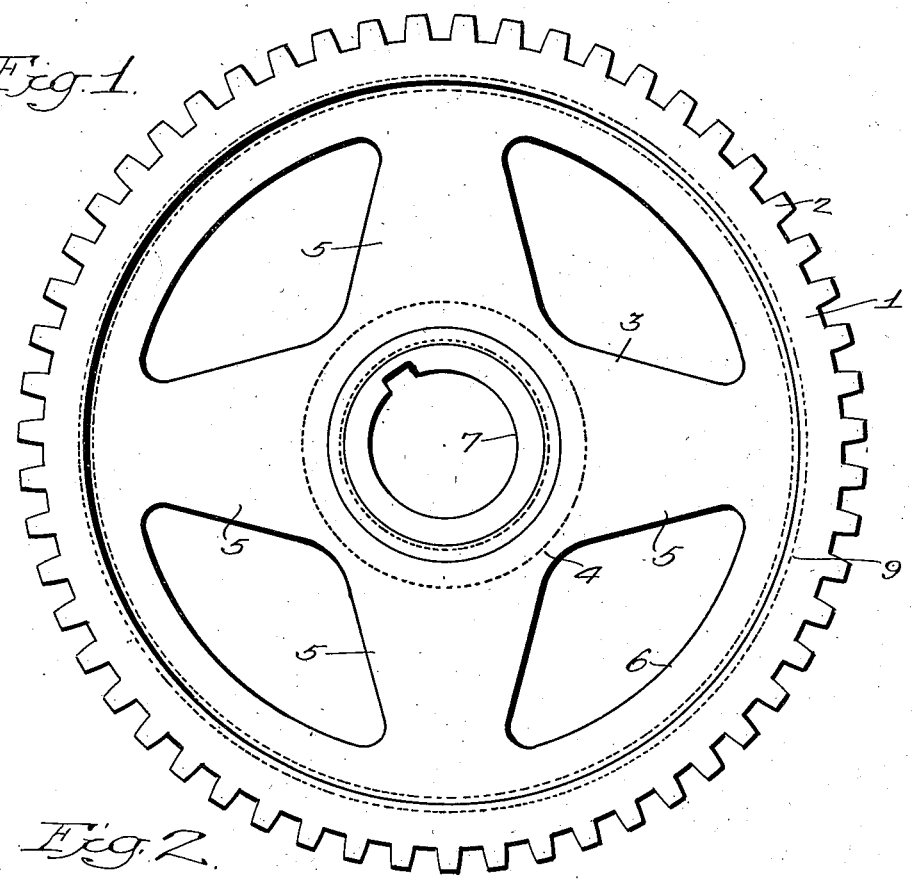
Figure 2:
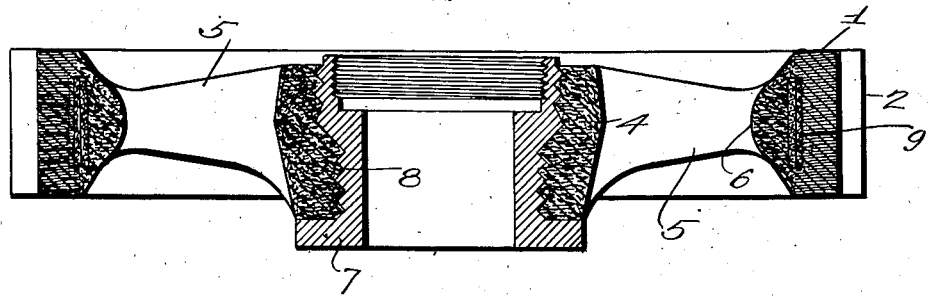

In the accompanying drawing:

Fig. 1 is a face view of a spoke type gear constructed in accordance with the invention; and Fig. 2 is a sectional view taken along line 2—2 of Fig. 1.

The illustrated fibre spoke gear to which the present invention is applied comprises a wheel portion composed of small pieces of fibrous material joined together by a binder, and a rim portion composed of fibrous laminations and a binder. The rim portion surrounds the wheel portion and is bonded thereto to form a unitary structure. Preferably, the binder employed in both the wheel portion and the rim portion is a synthetic resin, for example a phenolic resin, and more specifically a phenol-formaldehyde resin. The wheel portion composed of the small resin-impregnated fibrous pieces comprises a hub, spokes, and a rim or annulus surrounding the spokes. The scrap material resulting from the manufacture of the rim may be advantageously employed in the wheel portion, since the use of this scrap material, which would otherwise be wasted, effects a saving in the cost of the gear. Laminations are employed in the rim since, as is well known, such a structure has greater mechanical strength than a structure formed of impregnated mass material. Any suitable laminations may be used, ringlike laminations or segments lying parallel to the general plane of the gear and normal to its axis being preferred. However, the rim may be built up of small square or rectangular sheets or laminations placed perpendicularly to the general plane of the gear and arranged in ringlike fashion. A gear rim of this type and the method of making it are described in United States Patent No. 1,981,782, November 20, 1934.

Referring to the drawing, there is shown a gear made or constructed as above described. Such gear comprises a rim 1 having teeth 2 integral or cut therefrom and a spoke wheel portion designated generally by reference character 3 which comprises a central hub 4, spokes 5 and a rim or annulus 6. The hub 4 may surround and firmly bind itself to a metal bushing 7 having serrations 8 on its outer surface to provide the necessary firm bond with the hub. This bushing may be adapted in any suitable manner for fixedly mounting the gear on a rotatable element, such as a shaft, as well known.

In accordance with the present invention, there is provided between the rim and the load-transmitting or spoke portion, a sound-deadening element 9 which, in the gear illustrated, is interposed between the rim 1 and the annulus 6. This element preferably extends entirely about the gear, as shown in Fig. 1. It may comprise a piece of two-ply cotton belting cut to the approximate width shown relative to the dimensions of the other parts of the gear. Various other materials may be employed, however, some examples of which are sheet cork or ground cork in sheet form, duck, felt, or any fibrous material in any form, although sheet material is preferred since it is more conveniently usable in manufacture of the gear. In any case, the element 9 should be substantially free of the binder employed in the other parts of the gear.

In a typical instance of the manufacture of the gear in the form thereof illustrated herein, the rim 1 may be built up by assembling in a suitable mold fibrous laminations impregnated with a phenol formaldehyde resin in its initial state in which it is fusible. The element 9 may then be placed adjacent the inner surface of the composite rim in proper position as illustrated in Fig. 2. If desired or necessary, this element may be maintained in place by fastening it to the rim, for example by simply tying it to the rim by means of pieces of cord. The load-transmitting portion of the gear, which, in the present instance, consists of the spoke-wheel portion, may then be formed by depositing in the mold small pieces of fibrous material impregnated with phenol formaldehyde resin in its initial state. As above stated, these fibrous pieces preferably comprise the scrap obtained in cutting the segments for the laminated rim. These resin-impregnated fibrous pieces may vary widely in size, generally varying from ⅛ inch at the smallest width up to one inch at the greatest width. The resin associated with the fibrous pieces varies from 40% to 60%, the latter figure being preferable and at times powdered resin may be aded if it is desired or necessary. The laminated rim may contain about 40% of resin. If the metal bushing 7 is to be incorporated in the structure, it may be placed in the mold in proper association with the spoke-wheel portion during the forming thereof.

It will be noted that in the type of gear illustrated, the annulus 6 formed of the massed pieces of fibrous material has a substantial cross-sectional area and its outer face is of a width substantially greater than the width of the spokes and comparable to the width of the laminated rim 1. This structure assures the desired strength and firm bondage of the parts.

After the parts have been built up or assembled as above described, the gear, while in the mold, is subjected to a temperature between 370° F. and 400° F. at a pressure of about 2000 pounds per square inch in order to convert the resin to its final and infusible stage. The time of heating depends upon the size of the gear and may be in the neighborhood of thirty minutes or more. The curing is carried out at a temperature and for a time sufficient to convert the resin into its final stage in which it is infusible and insoluble. The teeth may then be cut on the outer surface of the rim 1 in any suitable manner known to the art. These teeth may be readily cut by any such methods because the product has the necessary machining qualities and strength.

During the molding and curing process, the resin-free, sound-deadening element 9 is fixed in place as clearly illustrated in Fig. 2. This element constitutes a binder-free section between the two binder-impregnated gear portions and serves to materially deaden or dampen sound vibrations. This element does not interfere with the firm bondage between the gear parts. In the molding and curing process, the rim or annulus 6 is firmly bonded to the rim 1 and a firm bond is is also obtained between the annulus 6 and the element 9 and between the rim 1 and the element 9. In the finished product, the rim 1 and the load-transmitting portion are rigid and dense by virtue of the cured binder associated with these parts but the element 9 remains relatively soft and retains its sound-deadening characteristics.

A gear constructed as illustrated and above described has the necessary strength and durability and operates more quietly than prior gears of this type. Such a gear has been found to be satisfactory when employed in motor vehicles, such as automobiles, requiring very quiet operation in conformity with the modern trend toward maximum silence of operation. Although the invention has been illustrated and described with reference to a specific preferred embodiment, it will be understood that it is not thus limited but is susceptible to change or modification within the scope of the appended claims.

I claim:

1. A fibre gear comprising a fibrous rim portion, a hub portion, a fibrous load-transmitting portion connecting said rim and hub portions, and sound-deadening means interposed between said rim portion and said load-transmitting portion.

2. A fibre gear comprising a fibrous rim portion, a fibrous hub portion, a fibrous load-transmitting portion connecting said rim and hub portions, and a multi-ply sound-deadening element interposed between said rim portion and said load-transmitting portion.

3. A fibre gear comprising a fibrous rim portion, a fibrous hub portion, a fibrous load-transmitting portion connecting said rim and hub portions, and a multi-ply sound-deadening strip interposed between said rim portion and said load-transmitting portion and extending entirely about the gear.

4. A fibre gear comprising a rim portion composed of fibrous laminations and a binder, a hub portion, a load-transmitting portion connecting said rim and hub portions, composed of interspersed pieces of fibrous material and a binder, and a binder-free sound-deadening element interposed between said rim portion and said load-transmitting portion.

5. A fibre gear comprising a rim portion composed of fibrous laminations impregnated with synthetic resin, a hub portion, a load-transmitting portion connecting said rim and hub portions, composed of interspersed pieces of fibrous material impregnated with synthetic resin, and a resin-free sound-deadening element interposed between said rim portion and said load-transmitting portion.

6. A fibre gear comprising a rim portion composed of fibrous laminations impregnated with phenolic resin in its infusible stage, a hub portion, a load-transmitting portion connecting said rim and hub portions, composed of interspersed pieces of fibrous material impregnated with phenolic resin in its infusible stage, and a resin-free sound-deadening element interposed between said rim portion and said load-transmitting portion.

7. A fibre spoke gear comprising a rim portion composed of fibrous laminations and a binder, a spoke and hub portion composed of interspersed pieces of fibrous material and a binder, and a binder-free sound-deadening fibrous strip interposed between said portions and extending entirely about the gear.

8. A fibre spoke gear comprising a rim portion composed of fibrous laminations impregnated with synthetic resin, a spoke and hub portion composed of interspersed pieces of fibrous material impregnated with synthetic resin, and a resin-free sound-deadening fibrous strip interposed between said portions and extending entirely about the gear.

9. A fibre spoke gear comprising a rim portion composed of fibrous laminations impregnated with phenolic resin in its infusible stage, a spoke and hub portion composed of interspersed pieces of fibrous material impregnated with phenolic resin in its infusible stage, and a resin-free sound-deadening fibrous strip interposed between said portions and extending entirely about the gear.

10. A fibre spoke gear comprising a rim portion composed of fibrous laminations and a binder, a spoke wheel portion composed of interspersed pieces of fibrous material and a binder, said wheel portion including a hub, spokes, and an annulus bonded at its outer face to said rim portion, and a binder-free sound-deadening strip interposed between said annulus and said rim portion and extending entirely about the gear.

11. A fibre spoke gear comprising a rim portion composed of fibrous laminations and a binder, a spoke wheel portion composed of interspersed pieces of fibrous material and a binder, said wheel portion including a hub, spokes, and an annulus of a width at its outer face substantially greater than the spokes and comparable to the width of said rim portion, said annulus being bonded at its said face to said rim portion, and a binder-free sound-deadening strip of lesser width than the said width of said annulus, interposed between said annulus and said rim portion and extending entirely about the gear.

12. A fibre gear comprising a fibre rim, a hub, a fibre load-transmitting section between said rim and said hub, and sound-deadening means located between said rim and said hub so as to dampen vibrations and reduce transmission thereof between the rim and the hub.

FRANK H. BENGE.